United States Patent
Fujii et al.

(10) Patent No.: US 8,775,056 B2
(45) Date of Patent: Jul. 8, 2014

(54) FUEL INJECTION CONTROLLER

(75) Inventors: Hiroaki Fujii, Kariya (JP); Shingo Nakata, Kariya (JP)

(73) Assignee: Denso Corporation, Kariya (JP)

( * ) Notice: Subject to any disclaimer, the term of this patent is extended or adjusted under 35 U.S.C. 154(b) by 738 days.

(21) Appl. No.: 13/078,190

(22) Filed: Apr. 1, 2011

(65) Prior Publication Data

US 2011/0246048 A1 Oct. 6, 2011

(30) Foreign Application Priority Data

Apr. 2, 2010 (JP) .................................. 2010-85627

(51) Int. Cl.
*F02D 41/00* (2006.01)
*F02D 41/04* (2006.01)
*F02D 41/40* (2006.01)
*F02D 43/00* (2006.01)

(52) U.S. Cl.
USPC ............................ 701/104; 123/480; 123/492

(58) Field of Classification Search
USPC .......... 701/104, 105, 102; 123/478, 480, 486, 123/492, 493
See application file for complete search history.

(56) References Cited

U.S. PATENT DOCUMENTS

| 4,495,924 | A | * | 1/1985 | Ueno et al. ..................... 123/478 |
| 5,241,939 | A | * | 9/1993 | Nonaka ......................... 123/492 |
| 2009/0271092 | A1 | | 10/2009 | Ashizawa |

FOREIGN PATENT DOCUMENTS

| JP | 63061735 A | * | 3/1988 | ............. F02D 41/04 |
| JP | 9-68072 | | 3/1997 | |
| JP | 2005-090337 | | 4/2005 | |
| JP | 2008-303799 | | 12/2008 | |
| JP | 2009-103106 | | 5/2009 | |

OTHER PUBLICATIONS

Office Action (1 page) dated Apr. 2, 2013, issued in corresponding Japanese Application No. 2010-085627 and English translation (2 pages).

* cited by examiner

*Primary Examiner* — Hieu T Vo
(74) *Attorney, Agent, or Firm* — Nixon & Vanderhye P.C.

(57) ABSTRACT

When an engine driving condition has been changed from an idling condition to a vehicle running condition, a controller measures an idling period. When the idling period is longer than a determination time period immediately after the vehicle is started, a penetrating-force-decrease control is performed. Therefore, even when a piston temperature is relatively low and particulate matters are easily generated, it can be restricted that fuel adheres to the piston top-surface by performing the penetrating-force-decrease control. Further, in the penetrating-force-decrease control, since the fuel is injected at optimum injection timing, it can be avoided that emission and fuel economy are deteriorated.

6 Claims, 3 Drawing Sheets

FUEL INJECTION CONTROLLER

CROSS-REFERENCE TO RELATED APPLICATION

This application is based on Japanese Patent Application No. 2010-85627 filed on Apr. 2, 2010, the disclosure of which is incorporated herein by reference.

FIELD OF THE INVENTION

The present invention relates to a fuel injection controller for a direct injection gasoline engine.

BACKGROUND OF THE INVENTION

In a direct injection gasoline engine, it is likely that fuel injected into a combustion chamber may adhere to a piston. If adhering fuel is not vaporized by an ignition timing, the adhering fuel is not combusted, which generates a lot of particulate matters (PM). Especially, in a case that piston temperature is relatively low, the fuel is less easily vaporized.

JP-2009-103106A shows that the fuel is injected at the time the piston is positioned at a vicinity of its intake bottom dead center if the piston temperature is low, whereby it is restricted that the fuel adheres to the piston.

However, JP-2009-103106A does not disclose a specific way of detecting piston temperature. A temperature sensor can not be directly provided to the piston. Thus, it is difficult to obtain accurate piston temperature.

Further, since the fuel injection timing is varied from an appropriate timing to a timing around its intake bottom dead center, fuel economy and emission may be deteriorated.

SUMMARY OF THE INVENTION

The present invention is made in view of the above matters, and it is an object of the present invention to provide a fuel injection controller for a direct injection gasoline engine in which fuel is less easily adhered to a piston without varying a fuel injection timing.

According to the present invention, a fuel injection controller is applied to a direct injection engine in which a fuel is directly injected into a combustion chamber through a fuel injector. The fuel injection controller includes:

a time measure means for measuring a low-load driving duration of the engine when an engine driving condition has been changed from a low-load driving condition to a high-load driving condition; and a penetrating-force decrease means for decreasing a penetrating force of the fuel injected from the fuel injector in such a manner that the penetrating force of the fuel is more decreased as the measured low-load driving duration is longer.

As the engine is longer driven under a low-load driving condition, the piston temperature is more decreased. When the engine drive condition is changed from a long low-load driving condition to a high-load driving condition, a fuel injection quantity is rapidly increased while the piston temperature is still low. A wet fuel adhering to the piston and unvaporized by an ignition timing is increased, which generates a lot of particulate matters (PM).

In view of this matter, when an engine driving condition has been changed from a low-load driving condition to a high-load driving condition, a fuel injection control is performed in such a manner that a penetrating force of the fuel is more decreased as the low-load driving duration is longer.

As the low-load driving duration is longer, it is estimated that the piston temperature is more decreased. Thus, without detecting the piston temperature directly, it is restricted that the fuel adheres to the piston.

Further, without varying the fuel injection timing, it is restricted that the fuel adheres to the piston. Thus, it is avoided that fuel economy and emission are deteriorated due to a variation in fuel injection timing.

BRIEF DESCRIPTION OF THE DRAWINGS

Other objects, features and advantages of the present invention will become more apparent from the following description made with reference to the accompanying drawings, in which like parts are designated by like reference numbers and in which.

DETAILED DESCRIPTION OF EMBODIMENTS

Hereinafter, an embodiment that embodies the present invention will be described with reference to the drawings.

Figure 1:
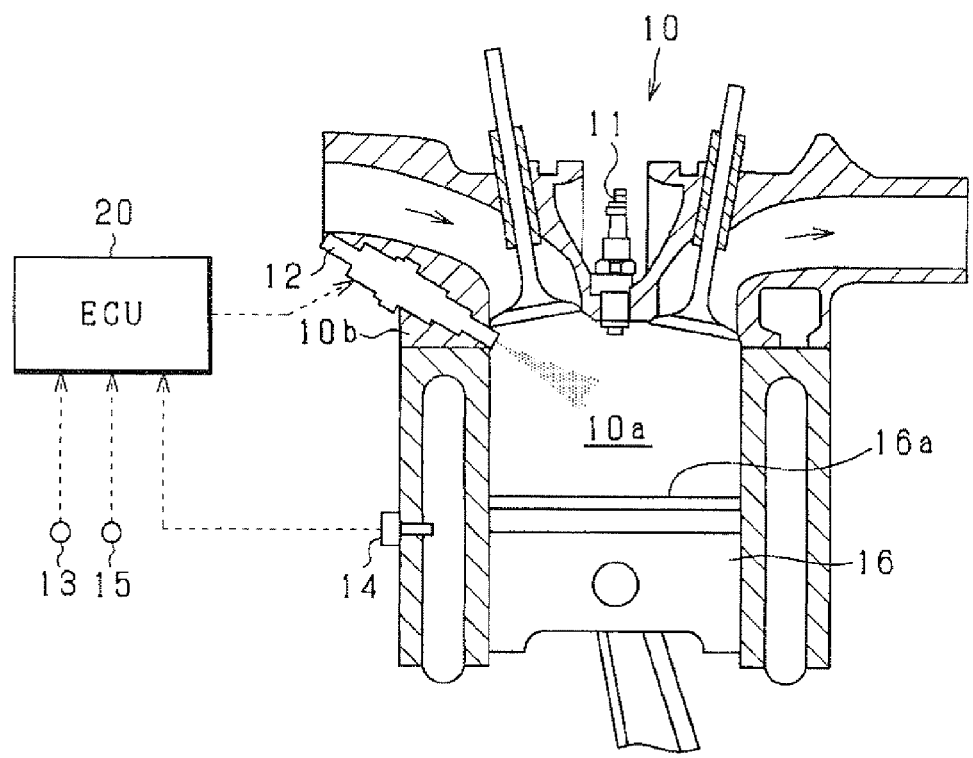
FIG. 1 is a cross-sectional view showing an engine to which a fuel injection controller is applied according to an embodiment of the present invention.

FIG. 1 is a cross sectional view schematically showing an engine 10. The engine 10 is a gasoline engine having a spark plug 11. Fuel gasoline is directly injected into a combustion chamber 10a from a fuel injector 12, which is provided to a cylinder block 10b.

The engine 10 is provided with a crank angle sensor 13, an accelerator position sensor, a coolant temperature sensor 14, and a fuel property sensor 15.

An electronic control unit (ECU) 20 receives detection signals from the above sensors. Based on these detection signals, the ECU 20 controls an ignition timing of the spark plug 11, a fuel injection quantity and a fuel injection timing of the fuel injector 12.

For example, based on an engine speed, which is computed based on a detection signal of the crank angle sensor 13, and a stepped quantity of an accelerator pedal, which is computed based on a detection signal of the accelerator position sensor, a target fuel injection quantity and a target fuel injection timing are computed. More specifically, the optimum fuel injection quantity and the optimum fuel injection time relative to the engine speed and the engine load are obtained by experiment in advance. These relationships are memorized in a map according to which the target fuel injection quantity and the target fuel injection timing are computed.

Figure 2:
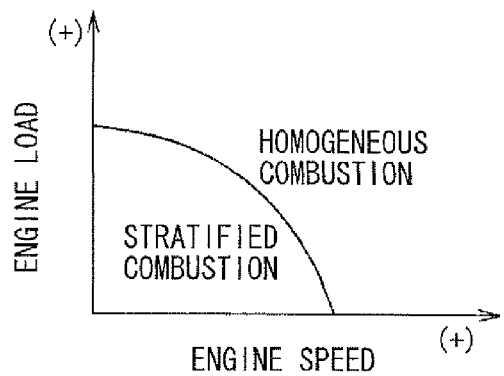
FIG. 2 is a map for explaining a stratified combustion region and homogeneous combustion region.

Further, as shown in FIG. 2, based on the engine speed and the engine load, the combustion mode is switched between the stratified combustion and the homogenous combustion. When the engine is at idling state or at low-speed, low-load state, the combustion mode is switched to the stratified combustion in which air-fuel ratio is thin (17-50), so that fuel economy is improved. When the engine is at high-speed, high-load state, the combustion mode is switched to the homogeneous combustion in which air-fuel ratio is around the stoichiometric air-fuel ratio (12-15), so that the engine output is enhanced.

In the stratified combustion, the fuel is injected to the combustion chamber 10a in a latter half of compression stroke. Then, the fuel generates tumble flow and swirl flow according to a shape of piston top-surface 16a, so that the injected fuel gathers around the spark plug 11. Meanwhile, in the homogeneous combustion, the fuel is injected in an intake stroke. The injected fuel is mixed with air in the combustion chamber 10a during the compression stroke so that homogeneous air-fuel mixture is generated.

In a direct injection engine, the injected fuel easily adheres to the piston top-surface 16a. If the adhering fuel is not vaporized by an ignition timing, the adhering fuel is not combusted, which generates a lot of particulate matters (PM).

According to the present inventors' study, a lot of PM are remarkably generated under the following conditions. That is, when idling has been continued for a long period after vehicle running, the piston temperature is decreased. When the vehicle is restarted after idling, the adhering fuel is less easily vaporized. The fuel injection quantity is also increased, whereby the quantity of wet fuel, which adheres to the piston top-surface 16a and is unvaporized by the ignition timing, is increased. Thus, a lot of PM are remarkably generated when the vehicle is started after long idling.

Figure 3:
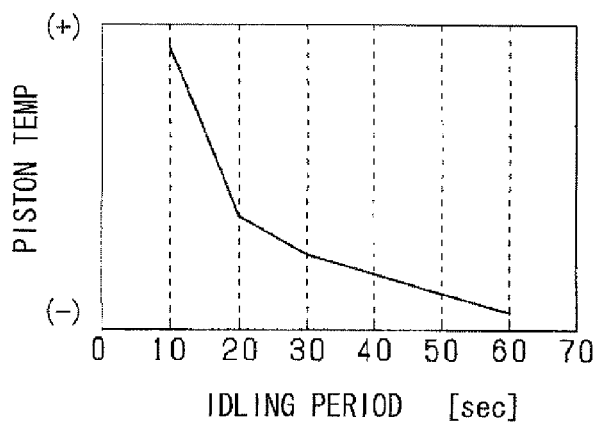
FIG. 3 is a graph showing a test result which indicates a relationship between an idling period and a piston temperature.
Figure 4:
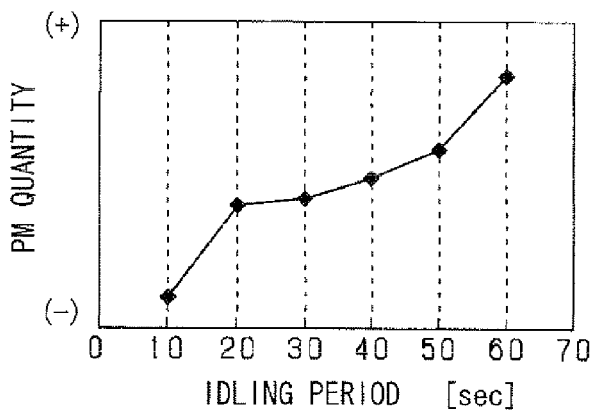
FIG. 4 is a graph showing a test result which indicates a relationship between PM discharged quantity and the idling period.

FIG. 3 is a graph showing a test result which indicates a relationship between an idling period and a piston temperature. It is apparent that the piston temperature is increased as the idling period becomes longer. FIG. 4 is a graph showing a test result which indicates a relationship between PM discharged quantity and the idling period. It is apparent that the PM discharged quantity is increased as the idling period becomes longer.

According to the present embodiment, when the vehicle condition is changed from an idling condition (low-load driving condition) to a vehicle running condition (high-load driving condition), the ECU 20 measures duration in which the idling condition has been continued (idling period). Then, the ECU 20 controls the fuel injection in such a manner that a penetrating force of the injected fuel is decreased as the measured idling period is longer, whereby it is restricted that the injected fuel adheres to a piston top-surface 16a.

Figure 5:
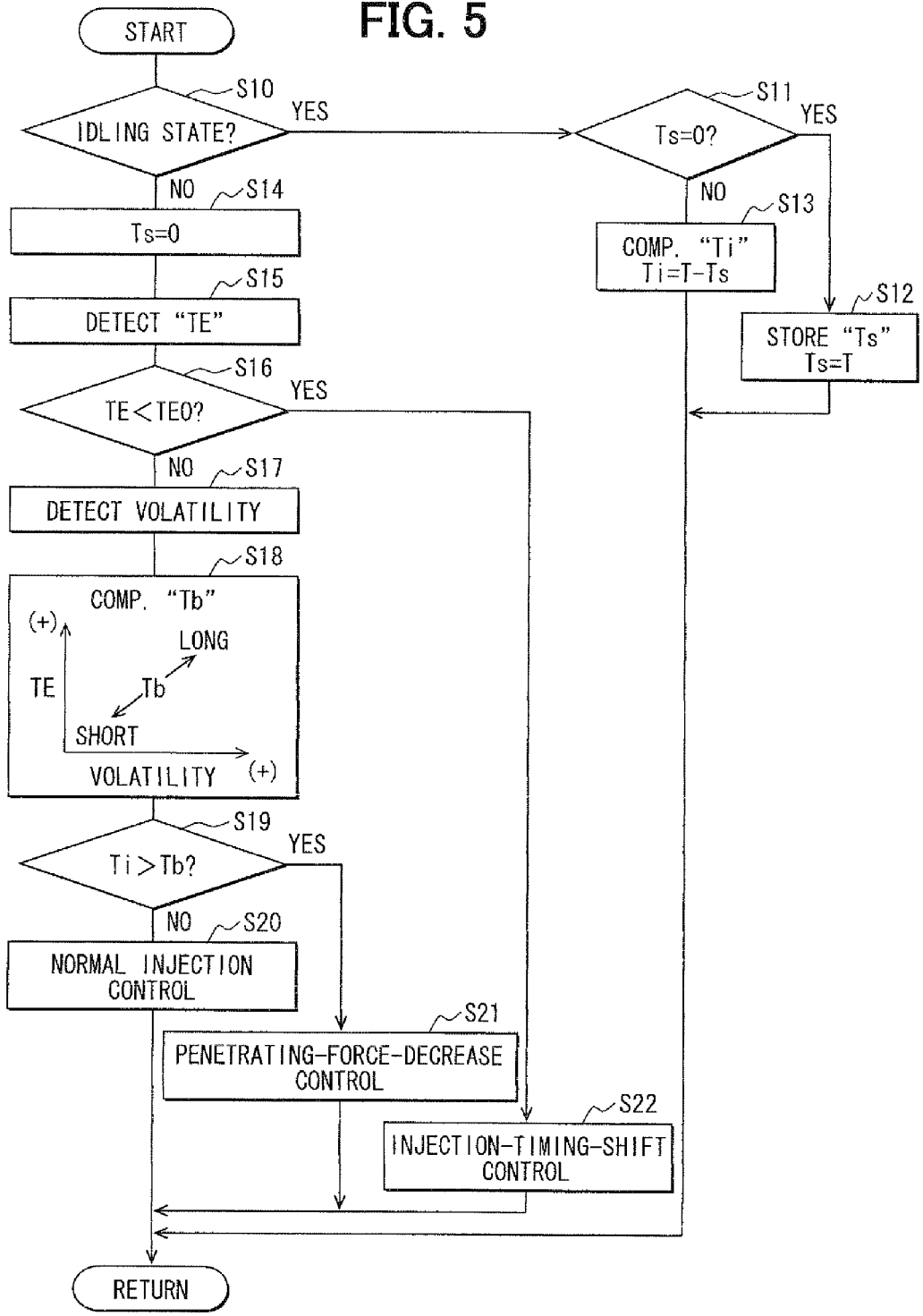
FIG. 5 is a flow chart showing a processing of a penetrating-force-decrease control.

A control for decreasing a penetrating force of the injected fuel will be described in detail. FIG. 5 is a flowchart showing a processing for decreasing the penetrating force of the injected fuel, which is referred to as a penetrating-force-decrease control. This control processing is executed by a microcomputer which the ECU 20 includes. When an ignition switch is turned on, this processing is initiated and is repeated at a specified period or specified crank angle.

In step S10, the computer determines whether the engine 10 is at idling state. When the answer is YES in step S10, the procedure proceeds to step S11 in which the computer determines whether an idle start timing Ts is reset (Ts=0). When the answer is YES in step S11, the procedure proceeds to step S12 in which the current timing T is stored as the idle start timing Ts (Ts=T). When the answer is NO in step S11 (Ts≈0), the procedure proceeds to step S13 in which the idle start timing Ts is subtracted from the current timing T to obtain the idling period Ti (Ti=T−Ts).

When the vehicle condition is changed from an idling condition to a vehicle running condition, the answer in step S10 becomes NO. The procedure proceeds to step S14 in which the idle start timing Ts is reset to zero (Ts=0). In step S15, an engine coolant temperature is detected as an engine temperature TE by the coolant temperature sensor 14.

In step S16, the computer determines whether the obtained engine temperature TE is less than a specified temperature TE0 (for example, 25° C.). When the answer is YES in step S16, the computer determines that the piston temperature is so low that the PM quantity can not be decreased enough by the penetrating-force-decrease control described above. The procedure proceeds to step S22 in which an injection-timing-shift control is executed.

As described above, the optimum fuel injection timing relative to the engine speed and the engine load is obtained by experiment in advance and memorized in a map. According to this map, the fuel injection timing is controlled so as to become the optimum fuel injection timing. At the moment the vehicle condition is changed from the idling condition to the vehicle running condition, a stratified combustion has been performed. Thus, the fuel is injected at the optimum timing in a latter half of the compression stroke in which the piston 16 slides up.

In the injection-timing-shift control in step S22, the fuel injection timing is advanced from the optimum timing toward the intake bottom dead center by a specified quantity. Thereby, since the distance between an injection port of the fuel injector 12 and a piston top-surface 16a is made longer, the quantity of fuel adhering to the piston top-surface 16a can be decreased. The PM quantity can be also decreased. However, it should be noted that the emission and the fuel economy are deteriorated since the injection timing is shifted from the optimum injection timing at which the emission and the fuel economy are optimum.

That is, in a case that the piston temperature is so low that the PM quantity can not be decreased by the penetrating-force-decrease control, the injection-timing-shift control is executed, whereby the PM quantity can be reduced even though the emission and the fuel economy are deteriorated.

In step S17, a fuel property (volatility) is obtained by the fuel property sensor 15. In step S18, based on the engine temperature TE obtained in step S15 and the fuel property obtained in step S17, the computer computes a determination time period Tb, which will be described later. Specifically, as the volatility is higher or the engine temperature TE is higher, the determination time period Tb is set longer.

In step S19, the computer determines whether the idling period Ti is longer than the determination time period Tb. When the answer is NO in step S19, the procedure proceeds to step S20 in which a normal injection control is executed so that the optimum injection timing and the optimum injection quantity are obtained.

When the answer is YES in step S19, the procedure proceeds to step S21 in which the penetrating-force-decrease control is executed. Specifically, the target quantity of fuel is injected by multiple injections in one combustion cycle. For example, a first fuel injection is conducted at the optimum injection timing and a second fuel injection is conducted immediately after the first fuel injection.

It is preferable that the penetrating-force-decrease control and the injection-timing-shift control are terminated when a specified time period has elapsed or when the coolant temperature has increased to a specified temperature. Then, the normal injection control is executed.

According to the present embodiment described above, following advantages can be obtained.

(1) According to the present embodiment, the idling period Ti is measured (S12, S13). When the idling period Ti is longer than the determination time period Tb (S19: YES) immediately after the vehicle is started, the penetrating-force-decrease control is performed (S21).

Therefore, even in a condition where the piston temperature is relatively low and the PM are easily generated, it can be restricted that the fuel adheres to the piston top-surface 16a by performing the penetrating-force-decrease control. Therefore, even when the vehicle is restarted after a long idling period, the PM generation is well restricted. Further, in the penetrating-force-decrease control, since the fuel is injected at the optimum injection timing, it can be avoided that emission and fuel economy are deteriorated.

(2) As the engine temperature TE is higher, the fuel adhering to the piston top-surface 16a is less unvaporized by the ignition timing. According to the present embodiment, as the engine temperature TE is higher, the determination time period Tb is set longer (S18), so that the penetrating-force-decrease control is less performed. Therefore, since the penetrating-force-decrease control is timely performed according to the piston temperature, it can be restricted that the penetrating-force-decrease control is unnecessary performed and the emission, the fuel economy are deteriorated.

(3) As the volatility of the fuel is higher, the fuel adhering to the piston top-surface 16a is less unvaporized by the ignition timing. According to the present embodiment, as the volatility of the fuel is higher, the determination time period Tb is set longer (S18), so that the penetrating-force-decrease control is less performed. Therefore, since the penetrating-force-decrease control is timely performed according to the piston temperature, it can be restricted that the penetrating-force-decrease control is unnecessary performed and the emission, the fuel economy are deteriorated.

(4) In a case that the penetrating-force-decrease control is executed under the condition where the engine temperature is very low (for example, lower than 25° C.), it can be restricted that fuel adheres to the piston 16, however, the adhering fuel is not vaporized by the ignition timing. Thus, the PM quantity can not be sufficiently reduced. Meanwhile, in a case that the injection-timing-shift control is executed, the fuel adheres to the piston 16 less than a case that the penetrating-force-decrease control is executed. However, the injection-timing-shift control may cause deterioration in fuel economy and emission.

In view of the above, according to the present embodiment, when engine temperature TE is less than the specified temperature TE0 (S16: YES), the computer determines that the injection-timing-shift control should be performed (S22) because the penetrating-force-decrease control can not reduce the PM quantity enough. Meanwhile, when the engine temperature TE is not fess than the specified temperature TE0 (S16: NO), the computer determines that the penetrating-force-decrease control can reduce the PM quantity enough. It can be avoided that the emission and the fuel economy are deteriorated.

Other Embodiment

The present invention is not limited to the embodiments described above, but may be performed, for example, in the following manner. Further, the characteristic configuration of each embodiment can be combined.

In the above embodiment, when the idling period Ti is longer than the determination time period Tb, the target quantity of fuel is injected by two injections in one combustion cycle. The number of injections in one combustion cycle can be varied according to the idling period Ti so that decreasing degree of the penetrating force is adjusted. For example, in the case of Ti>Tb, the number of fuel injection in one combustion cycle is increased as the idling period Ti is longer.

In the penetrating-force-decrease control, the penetrating force of the fuel can be decreased by decreasing the fuel pressure supplied to the fuel injector 12 without varying the injection start timing. The fuel pressure supplied to the fuel injector may be decreased according to the idling period Ti. As the idling period Ti is longer, the fuel pressure is more decreased.

The determination time period Tb can be variably set according to ambient temperature. As the ambient temperature is lower, the determination time period Tb is set shorter.

In an engine having an idle reduction function, when an idle reduction period is longer than a specified determination time period, the penetrating-force-decrease control can be performed.

What is claimed is:

1. A fuel injection controller for a direct injection engine in which a fuel is directly injected into a combustion chamber through a fuel injector, the fuel injection controller comprising:
    a time measure means for measuring a low-load driving duration of the engine when an engine driving condition has been changed from a low-load driving condition to a high-load driving condition; and
    a penetrating-force decrease means for decreasing a penetrating force of the fuel injected from the fuel injector in such a manner that the penetrating force of the fuel is more decreased as the measured low-load driving duration is longer.

2. A fuel injection controller for a direct injection engine according to claim 1, wherein
    when an engine temperature is greater than or equal to a specified temperature at a time the engine driving condition has been changed, the penetrating-force decrease means decreases the penetrating force of the fuel, and
    when the engine temperature is less that the specified temperature at a time the engine driving condition has been changed, a fuel injection timing of immediately after the engine driving condition has been changed is brought into a vicinity of an intake bottom dead center.

3. A fuel injection controller for a direct injection engine according to claim 1, wherein
    the penetrating-force decrease means more decreases the penetrating force of the fuel as the engine temperature is lower at a time the low-load driving condition is started.

4. A fuel injection controller for a direct injection engine according to claim 1, wherein
    the penetrating-force decrease means more decreases the penetrating force of the fuel as the fuel supplied to the fuel injector has a lower volatility.

5. A fuel injection controller for a direct injection engine according to claim 1, wherein
    the direct injection engine is for driving a vehicle,
    the low-load driving condition includes an idling condition of the engine with the vehicle stopped, and
    the high-load driving condition includes a vehicle running condition.

6. A fuel injection controller for a direct injection engine according to claim 1,
    a certain quantity of the fuel is injected by multiple injections in one combustion cycle so as to decrease the penetrating force of the fuel.

* * * * *